(12) United States Patent
Kuo et al.

(10) Patent No.: US 8,952,920 B2
(45) Date of Patent: Feb. 10, 2015

(54) TOUCH PANEL, TOUCH DISPLAY PANEL AND REPAIRING METHOD THEREOF

(75) Inventors: Wei-Hung Kuo, Hsin-Chu (TW);
Tun-Chun Yang, Hsin-Chu (TW);
Seok-Lyul Lee, Hsin-Chu (TW);
Wei-Ming Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 822 days.

(21) Appl. No.: 13/030,144

(22) Filed: Feb. 18, 2011

(65) Prior Publication Data

US 2011/0254804 A1   Oct. 20, 2011

(30) Foreign Application Priority Data

Apr. 20, 2010   (TW) .............................. 99112335 A

(51) Int. Cl.
*G06F 3/045* (2006.01)
*G06F 3/041* (2006.01)
*G06F 3/044* (2006.01)

(52) U.S. Cl.
CPC .............. *G06F 3/045* (2013.01); *G06F 3/0418* (2013.01); *G06F 3/044* (2013.01); *G06F 2203/04111* (2013.01)
USPC .......................................... 345/174; 345/173

(58) Field of Classification Search
USPC .................................. 345/173, 174
See application file for complete search history.

(56) References Cited

U.S. PATENT DOCUMENTS

| 6,597,427 | B1 | 7/2003 | Katsu |
| 7,132,671 | B2 | 11/2006 | Hatajima |
| 7,319,465 | B2 | 1/2008 | Mikami et al. |
| 2003/0042482 | A1 | 3/2003 | Jun |
| 2005/0099550 | A1 | 5/2005 | Jinno |
| 2010/0007615 | A1* | 1/2010 | Wu et al. ........................ 345/173 |

FOREIGN PATENT DOCUMENTS

| JP | 2001033810 | 2/2001 |
| JP | 2003078143 | 3/2003 |
| JP | 2007140036 | 6/2007 |
| TW | 200620542 | 6/2006 |
| TW | 201003490 | 1/2010 |

* cited by examiner

*Primary Examiner* — Amare Mengistu
*Assistant Examiner* — Jennifer Zubajlo
(74) *Attorney, Agent, or Firm* — Winston Hsu; Scott Margo

(57) ABSTRACT

A touch display panel contains a display panel and a touch sensing array. The touch sensing array is disposed on the display panel, wherein the touch sensing array includes a plurality of first transparent sensing series, a plurality of second transparent sensing series, and a plurality of conductive repair marks. The first transparent sensing series are arranged along a first direction. Each of the first transparent sensing series includes a plurality of first transparent sensing pads electrically connected with each other; the second transparent sensing series are arranged along a second direction. Each of the second transparent sensing series includes a plurality of second transparent sensing pads electrically connected with each other, and each first transparent sensing pad is isolated from each second transparent sensing pad. The conductive repair marks are disposed corresponding to the first transparent sensing pads or the second transparent sensing pads.

21 Claims, 19 Drawing Sheets

TOUCH PANEL, TOUCH DISPLAY PANEL AND REPAIRING METHOD THEREOF

BACKGROUND OF THE INVENTION

1. Field of the Invention

This invention relates generally to a touch panel, a touch display panel and a repairing method thereof, and more specifically, to a touch panel, a touch display panel and a repairing method thereof having conductive repair marks.

2. Description of the Prior Art

Portable electronic products such as tablet computers, Personal Digital Assistants (PDA), mobile phones, Global Positioning Systems (GPS), and video players are widely combined with touch panels to be communication interfaces of human-machine data, thereby serving as multi-purpose electronic devices.

The touch function of the touch display panel is mainly provided by a touch sensing array. The touch sensing array has a plurality of horizontal sensing pads and a plurality of vertical sensing pads, to respectively sense the horizontal or vertical axis of input positions. However, there is often an open circuit caused by static electricity or scratches in the touch sensing array in the prior art. As long as one of the horizontal sensing pads or vertical sensing pads is broken, the functions of the horizontal sensing pads or vertical sensing pads may not work, therefore leading to breaking of the touch sensing array and reduction of the yield of the touch sensing array. Therefore, a variety of repairing methods of touch display panels are provided by the panel manufacturers for repairing the broken touch sensing array.

The repairing method of touch sensing arrays in the prior art involves forming a repair line between the two broken sensing pads, such that the sensing signals can be transmitted through the repair line and bypass the broken position. However, the material of the sensing pad is usually composed of a transparent conductive material, such as indium tin oxide (ITO). Therefore, when forming the repair line, it is difficult for the repairing machines to recognize the position of the transparent sensing pad, resulting in difficulty in alignment. Furthermore, before the repair lines are formed, the protective layer on the sensing pads should be burned through to form contact holes. As the sensing pads are made of transparent materials, laser energy is not easily focused to form contact holes. Consequently, more laser energy is required to form the contact holes. The above problems contribute to the difficulty of repairing touch panels, and a solution is needed to solve these problems.

SUMMARY OF THE INVENTION

This invention provides a touch panel, a touch display panel and repairing method thereof to increase the positioning accuracy and to more easily form contact holes during the repair process.

According to a preferred embodiment of the present invention, a touch display panel including a display panel and a touch sensing array is provided. The touch sensing array is disposed on the display panel, wherein the touch sensing array includes a plurality of first transparent sensing series, a plurality of second transparent sensing series, and a plurality of conductive repair marks. The first transparent sensing series are arranged along a first direction and each first transparent sensing series includes a plurality of first transparent sensing pads electrically connected with each other. The second transparent sensing series are arranged along a second direction, wherein each second transparent sensing series includes a plurality of second transparent sensing pads electrically connected with each other, and each first transparent sensing pad is isolated from each second transparent sensing pad. The conductive repair marks are disposed corresponding to the first transparent sensing pads or the second transparent sensing pads.

According to another preferred embodiment of the present invention, a touch panel including a substrate and a touch sensing array is provided. The touch sensing array is disposed on the substrate and the touch sensing array includes a plurality of first transparent sensing series, a plurality of second transparent sensing series, and a plurality of conductive repair marks. The first transparent sensing series are arranged along a first direction and includes a plurality of first transparent sensing pads electrically connected with each other. The second transparent sensing series are arranged along a second direction and includes a plurality of second transparent sensing pads electrically connected with each other. Each first transparent sensing pad is isolated from each second transparent sensing pad. The conductive repair marks are disposed corresponding to the first transparent sensing pads or the second transparent sensing pads.

According to another preferred embodiment of the present invention, a method of repairing a touch panel is disclosed. The touch panel includes a substrate and a touch sensing array. The touch sensing array is disposed on the substrate and includes a plurality of first transparent sensing series, a plurality of second transparent sensing series, and a plurality of conductive repair marks. The first transparent sensing series are arranged along a first direction and each first transparent sensing series includes a plurality of first transparent sensing pads electrically connected with each other. The second transparent sensing series are arranged along a second direction and each second transparent sensing series includes a plurality of second transparent sensing pads electrically connected with each other. Each first transparent sensing pad is isolated from each second transparent sensing pad. The conductive repair marks are disposed corresponding to the first transparent sensing pads or the second transparent sensing pads. Next, a repair process is performed by using the conductive repair mark as an alignment mark to form a repair line electrically connected with the adjacent first sensing pads or the second transparent sensing pads.

Due to the non-transparent conductive repair marks provided on the transparent sensing pads, the position of each transparent sensing pad can be identified by equipments in the follow-up repair process to increase the positioning accuracy. On the other hand, laser energy can also be reflected and concentrated by non-transparent conductive repair marks in the follow-up repair process. Therefore, contact holes can be formed more easily within the protective layer so as to improve the total efficiency of the repair process.

These and other objectives of the present invention will no doubt become obvious to those of ordinary skill in the art after reading the following detailed description of the preferred embodiment that is illustrated in the various figures and drawings.

DETAILED DESCRIPTION

For those skilled in the art to understand this invention, numerous embodiments are described below annexing drawings to minutely illustrate the matters of the invention and the purpose thereof.

Figure 1:
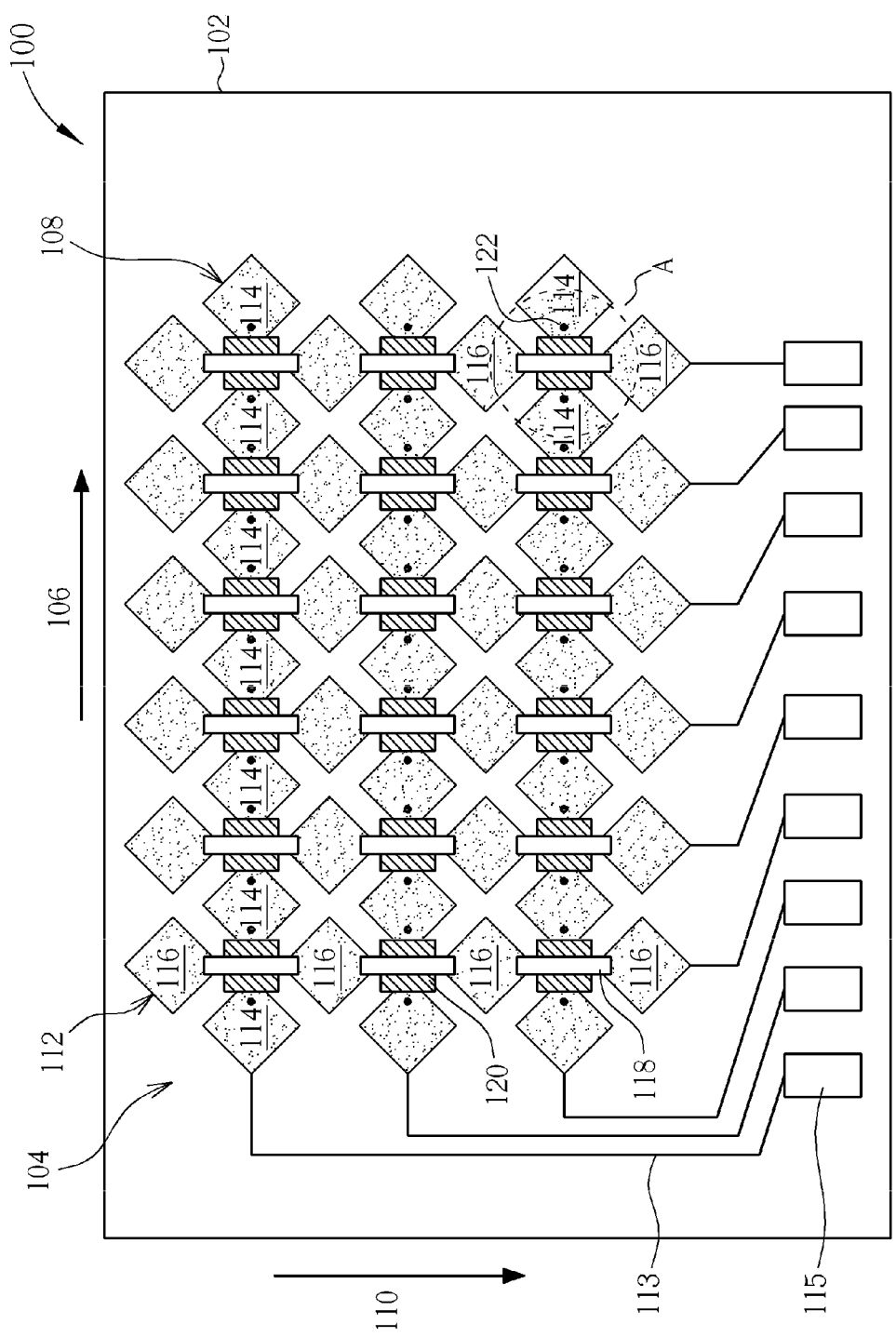
FIG. 1 schematically depicts a planar view of a touch panel in accordance with the first embodiment of this invention.

FIG. 1 schematically depicts a planar view of a touch panel in accordance with the first embodiment of this invention. As shown in FIG. 1, a touch panel 100 includes a substrate 102 and a touch sensing array 104 disposed on the substrate 102. The substrate 102 may be a transparent soft substrate or a transparent hard substrate such as glass substrate, plastic substrate, or quartz substrate, etc. In this embodiment, the touch sensing array 104 includes a plurality of first transparent sensing series 108 parallel with a first direction 106 (the horizontal direction of FIG. 1, for example) and a plurality of second transparent sensing series 112 parallel with a second direction 110. The first direction 106 is substantially perpendicular to the second direction no. Each first transparent sensing series 108 includes a plurality of first transparent sensing pads 114 electrically connected with each other and each second transparent sensing series 112 includes a plurality of second transparent sensing pads 116 and a plurality of bridge lines 118. As shown in FIG. 1, a patterned insulating layer 120, for example, a plurality of insulating islands 120a, may be disposed on two adjacent second transparent sensing pads 116 in the same second transparent sensing series 112, and each bridge lines 118 are disposed corresponding to each insulating islands 120a to electrically connect with two adjacent second transparent sensing pads 116. In this way, the first transparent sensing series 108 can be isolated from the second transparent sensing series 112, and the first transparent sensing series 108 and the second transparent sensing series 112 can respectively sense the touch position of two-axes in the first direction 106 and the second direction no on the substrate 102. The first transparent sensing series 108 and the second transparent sensing series 112 respectively connect to the surrounding contact pads 115 via a plurality of connect lines 113. The contact pads 115 can be electrically connected by the extra driven integrate circuit (IC) to drive the first transparent sensing series 108 and the second transparent sensing series 112, therefore achieving the sensing purpose. The detailed driving method is known to those skilled in the art, and the details are omitted. It needs to be noted, however, that the substrate 102 may be rotated 90 degree clockwise or counterclockwise. For example, the first transparent sensing series 108 may be parallel with the second direction no and the second transparent sensing series 112 may be parallel with the first direction 106. The arrangement in variation and moderation of this invention should be also within the scope of this invention.

The first transparent sensing pads 114 and the second transparent sensing pads 116 are composed of the same transparent conductive layer, and the material of which may be indium tin oxide (ITO), indium zinc oxide (IZO), cadmium tin oxide (CTO), aluminum zinc oxide (AZO) and indium tin zinc oxide (ITZO), but is not limited thereto. The patterned insulating layer 120 (such as the insulating islands 120a) includes a variety of insulating materials, such as organic material or inorganic material. The organic material may be resins such as enzocyclobutane (BCB), cycloolefin, polymide, polyamide, polyester, polyalcohol, poly(ethylene oxide), polystyrene, resin, polyether, polyketone. The inorganic material may be silicon oxide, silicon nitride, silicon oxynitride, silicon carbide, aluminum oxide, or the combination thereof, but is not limited thereto. The bridge line 118 includes a variety of metal conductive materials such as aluminum, copper, silver, gold, titanium, molybdenum, tungsten, but is not limited thereto.

Figure 2:
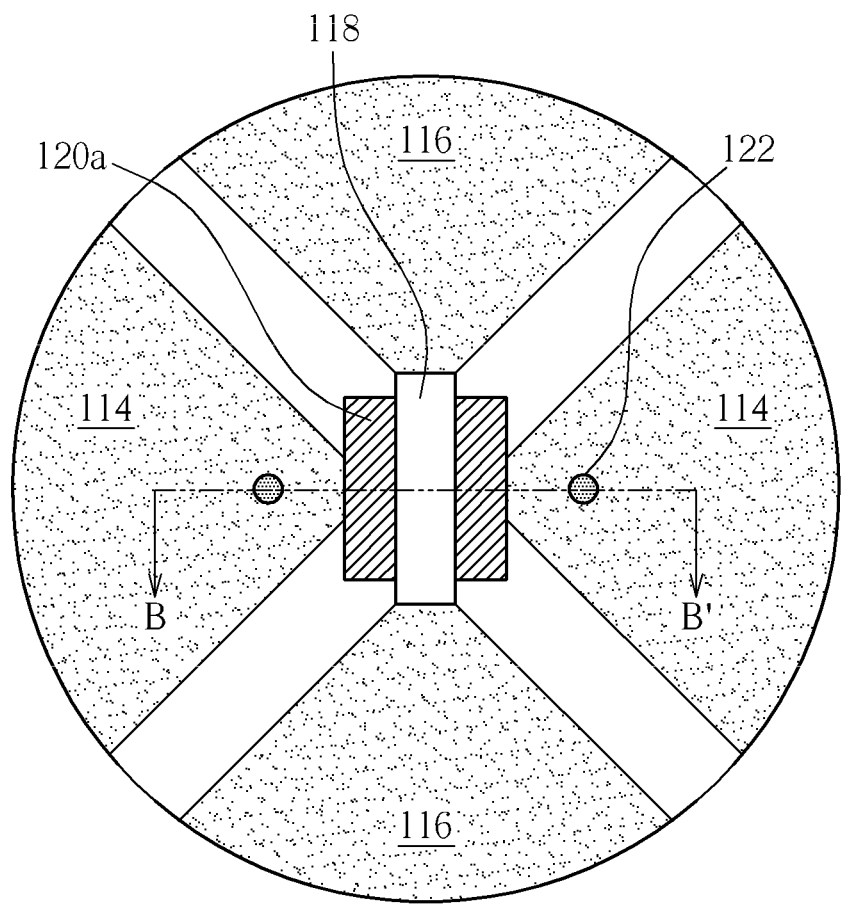
FIG. 2 and FIG. 3 schematically depict a touch panel in accordance with the first embodiment of this invention.
Figure 3:
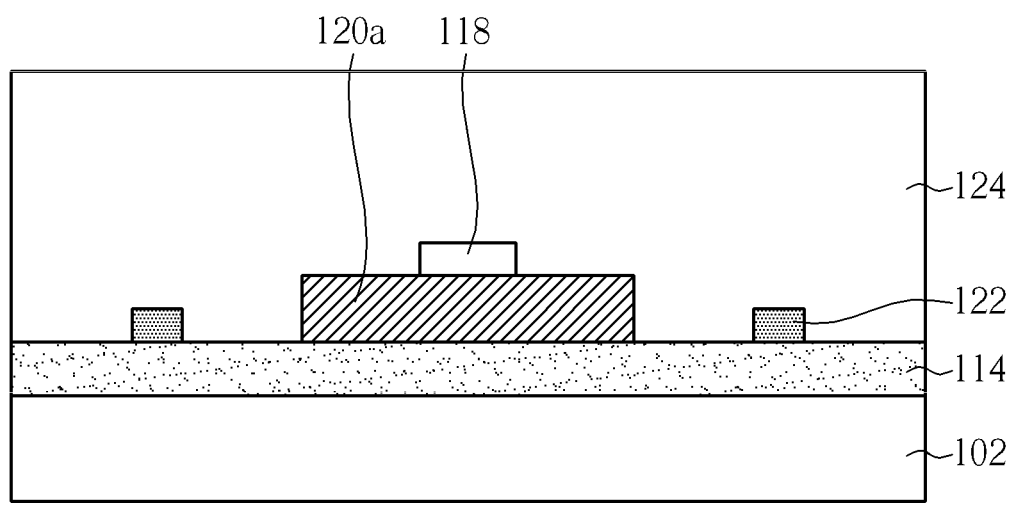

In order to solve the problems about the alignment difficulty caused from the transparent materials of the first transparent sensing pads 114 or the second transparent sensing pads 116 in the follow-up repair process, the touch sensing array 104 of the invention further includes a plurality of non-transparent conductive repair marks 122 disposed on the corresponding first transparent sensing series 108. The arranged direction of the conductive repair marks 122 may be substantially parallel with the first transparent sensing series 108, meaning that the arranged direction of the conductive repair marks 122 may be substantially parallel with the first direction 106. In another embodiment, the arranged direction of the conductive repair marks 122 may be another direction. The detailed positions of the conductive repair marks 122 can be found in FIG. 2 and FIG. 3, schematically depicting a touch panel in accordance with the first embodiment of this invention, wherein FIG. 2 is an enlarged schematic diagram of area A in FIG. 1, and FIG. 3 is a schematic, sectional view taken alone line B-B' of FIG. 2. As shown in FIG. 2 and FIG. 3, the conductive repair marks 122 are disposed on the first transparent sensing pads 114. In a preferred embodiment, the conductive repair marks 122 are disposed on the first transparent sensing pads 114 near the isolating islands 120a. That is, there is a set of the corresponding conductive repair marks 122 disposed on both sides of the isolating islands 120a near the first transparent sensing pads 114. The material of the conductive repair marks 122 includes a variety of non-transparent conductive materials, such as aluminum, copper, silver, gold, titanium, molybdenum, tungsten, or other metals, but is not limited thereto. The conductive repair marks 122 are electrically connected to the first transparent sensing pads 114. The width of each conductive repair mark 122 is substantially between 1 micrometer (μm) and 25 μm. Each conductive repair mark 122 can include various shapes, such as a circle as shown in FIG. 2, a square, a triangle, a polygon, but is not limited thereto. In addition, the touch panel 100 of this embodiment includes a protective layer 124 disposed on the top of the touch sensing array 104. The protective layer 124 includes various organic or inorganic protective materials, wherein the organic material may be resin such as enzocyclobutane (BCB), cycloolefin, polymide, polyamide, polyester, polyalcohols, poly(ethylene oxide), polystyrene, resin, polyether, polyketone, and the inorganic material may be silicon oxide, silicon nitride, silicon oxynitride, silicon carbide, aluminum oxide, or the combination thereof, but is not limited thereto.

The method of manufacturing the touch panel 100 in the present embodiment includes, for example, forming a transparent conductive layer entirely on the substrate 102. The transparent conductive layer is patterned to form the first transparent sensing pads 114 and the second transparent sensing pads 116. The insulating islands 120a are formed and the corresponding bridge lines 118 are formed on the insulating islands 120a. Then, the conductive repair marks 122 are formed on the first transparent sensing pads 114. Finally, the protective layer 124 is formed. In a preferred embodiment of the invention, the conductive repair marks 122 and the bridge lines 118 can be formed in the same process, for example, in one lithography process and etching process or in one screen printing process, to simplify the process and reduce the cost for the process.

Figure 4:
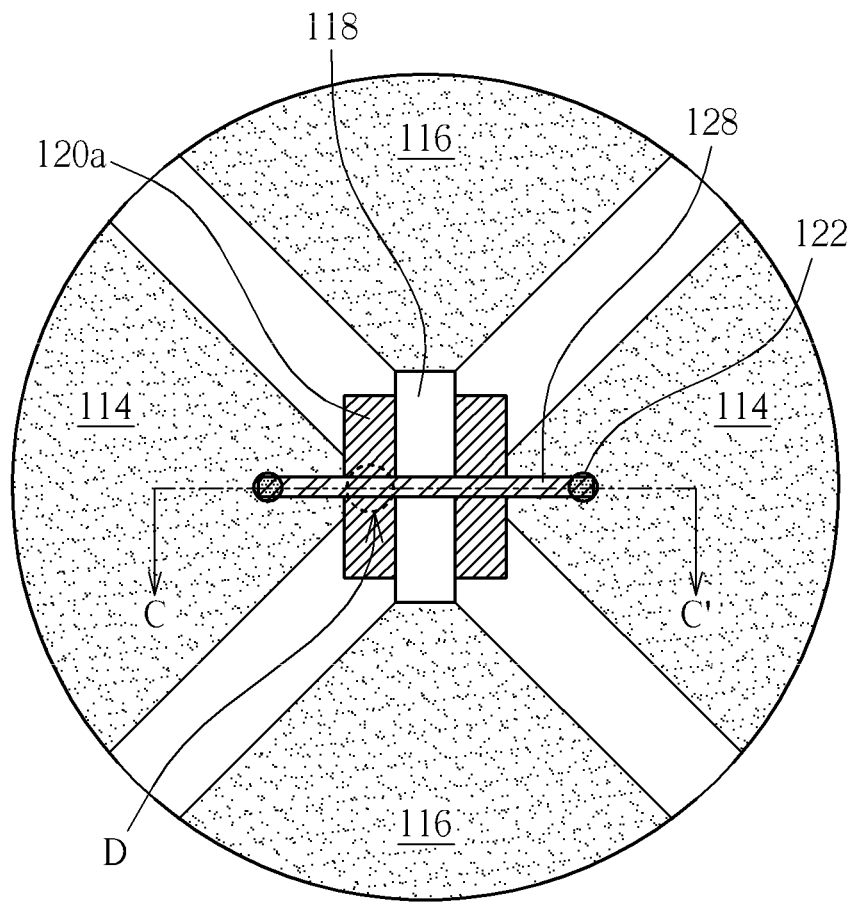
FIG. 4 and FIG. 5 schematically depict a touch panel while repairing in accordance with the first embodiment of this invention.
Figure 5:
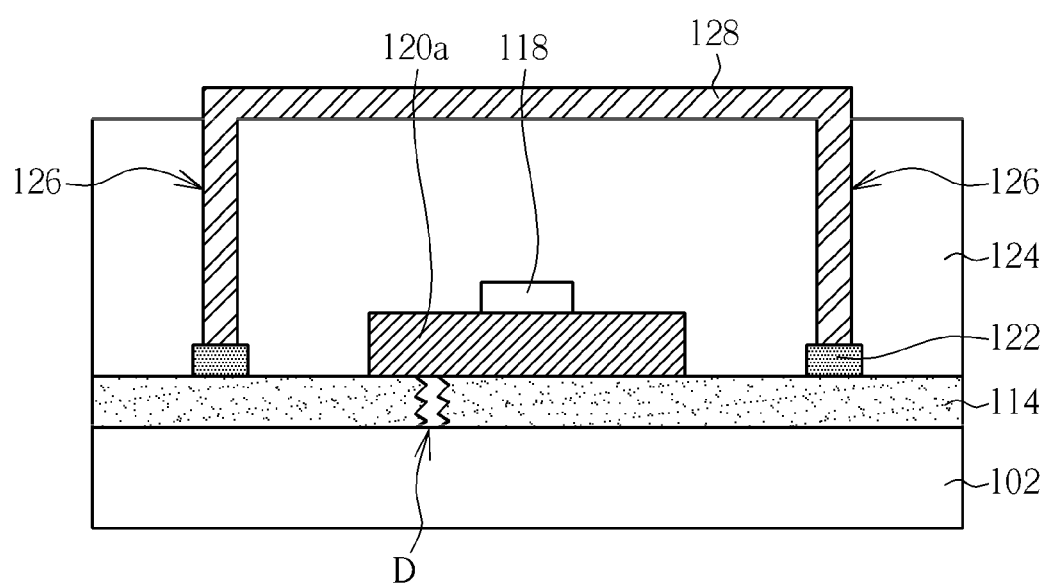

The conductive repair marks 122 of the present invention can be the alignment marks in the follow-up repair process for forming the touch sensing array 104. During the repair process, such as a Laser Chemical Vapor Deposition (Laser CVD) process, the non-transparent conductive repair marks 122 can be used for position alignment, helping equipments align to the intersections (the locations of the isolating islands) of the first transparent sensing series 108 and the second transparent sensing series 112, and to form repair lines in the intersections in the follow-up process. The relative position of each of the conductive repair marks and repair lines and the connected method thereof are described hereinafter. FIG. 4 and FIG. 5 schematically depict a touch panel while repairing in accordance with the first embodiment of this invention, wherein FIG. 5 is a sectional view taken alone line C-C' of FIG. 4. As shown in FIG. 4 and FIG. 5: if there is a defect, such as an open circuit formed between the two adjacent first transparent sensing pads 114 because of the defect in area D, the first transparent sensing series 108 would lose the sensing function and then need to be repaired. As shown in FIG. 4 and FIG. 5, besides the aforementioned elements, the touch panel 100 further includes a repair line 128 and a plurality of contact holes 126 after the repair process. The contact holes 126 are disposed within the protective layer 124 and respectively correspond to the conductive repair marks 122 located on both sides of the insulating islands 120a. The repair lines 128 include conductive material, such as tungsten, molybdenum, silver, gold, aluminum, copper, or other metals. The repair lines 128 are disposed on the protective layer 124 and in the contact holes 126 correspondingly. By the connection of the contact holes, the repair lines 128 can be electrically connected to the conductive repair marks 122 located on both sides of the insulating islands 120a, and also the two adjacent first transparent sensing pads 114. Consequently, the first transparent sensing series 108 is no longer broken by the defects of area D, and can be connected once more by the repair lines 128.

Besides the alignment function of the conductive repair marks 122, the laser processes, which is performed for forming the contact holes 126 correspondingly on the conductive repair marks 122 within the protective layer 124, can reflect and concentrate energy more easily because of the non-transparent conductive repair marks 122, therefore forming the contact holes 126 more easily. Besides, by employing the conductive materials of the conductive repair marks 122, the repair lines 128 can be electrically connected to the repair-requiring transparent sensing pads more easily, therefore improving the possibility of repairing.

Figure 6:
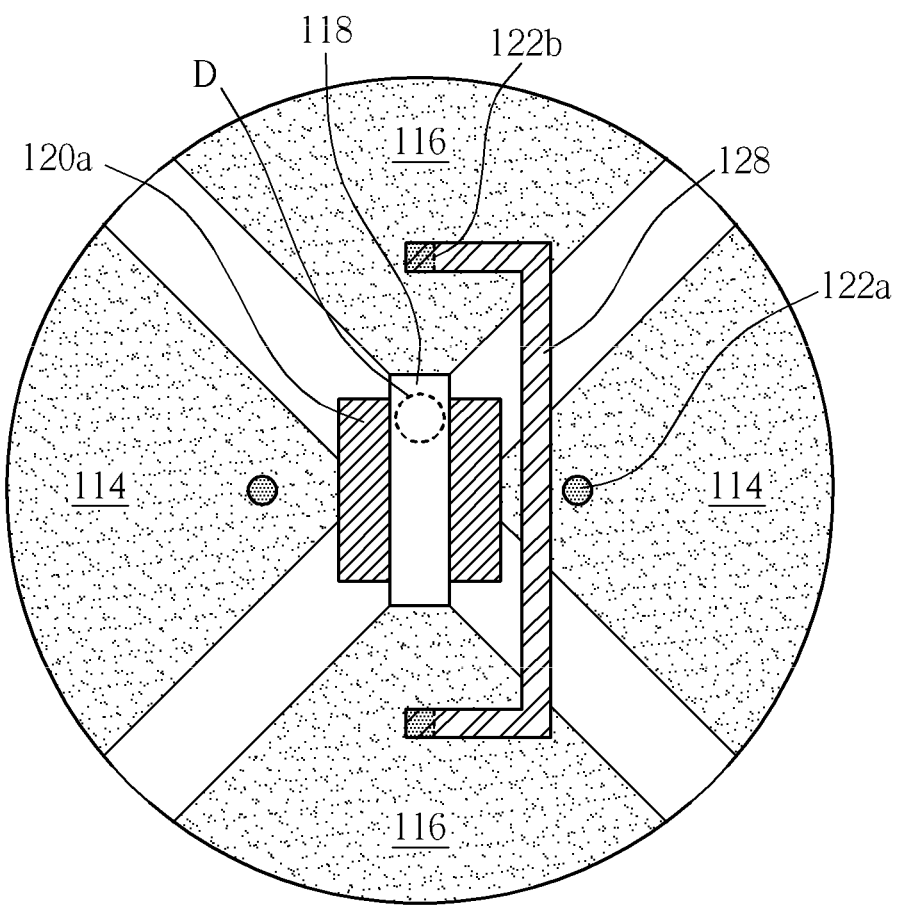
FIG. 6 schematically depicts a touch panel in accordance with the second embodiment of this invention.

Refer to FIG. 6, which schematically depicts a touch panel in accordance with the second embodiment of this invention. The conductive repair marks 122 not only can be disposed on the first transparent sensing pads 114, but also can be disposed on the second transparent sensing pads 116. As shown in FIG. 6, the conductive repair marks 122 include the conductive repair marks 122a and the conductive repair marks 122b. The conductive repair marks 122a are disposed on the first transparent sensing pads 114 for being as a repairing alignment mark in the first direction 106, while the conductive repair marks 122b are disposed on the second transparent sensing pads 116 for being as a repairing alignment mark in the second direction 110. If the second transparent sensing pads 116 need to be repaired because of the defects in area D, the repair line 128 can be formed according to the conductive repair marks 122b. The arrangement, material of the conductive repair mark 122b and the method of forming the repair line 128 in the follow-up repair process according to the conductive repair mark 122b are substantially similar to those of the conductive repair mark 122a and are not described repeatedly. It needs to be noted that, in order to distinguish the conductive repair mark 122a from the conductive repair mark 122b more precisely, the conductive repair mark 122a and the conductive repair mark 122b can have different shapes. For example, the shape of the conductive repair mark 122a may be a circle, and the shape of the conductive repair mark 122b may be a rectangle. However, it is not limited thereto. In another embodiment, only the conductive repair mark 122b is disposed along the second direction 110 while there is no conductive repair mark 122a disposed along the first direction 106. The embodiment can be altered in accordance with the needs of the desired products. Further, the planar layout of the repair lines 128 is a straight line as shown in FIG. 4. In another embodiment by considering the uneven surface of the area D which may disturb the formation of the connect line 128, the planar layout of the repair line can include a curved shape having at least a turning bypassing area D as shown in FIG. 6.

Figure 7:
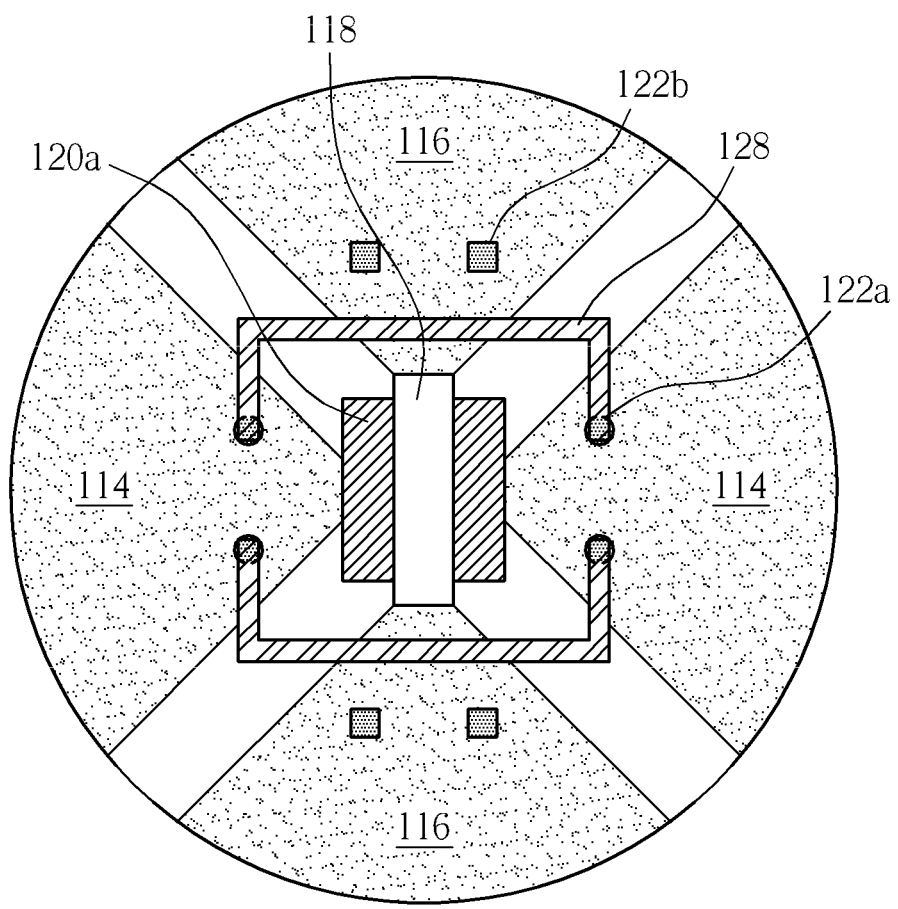
FIG. 7 schematically depicts a touch panel in accordance with the third embodiment of this invention.
Figure 8:
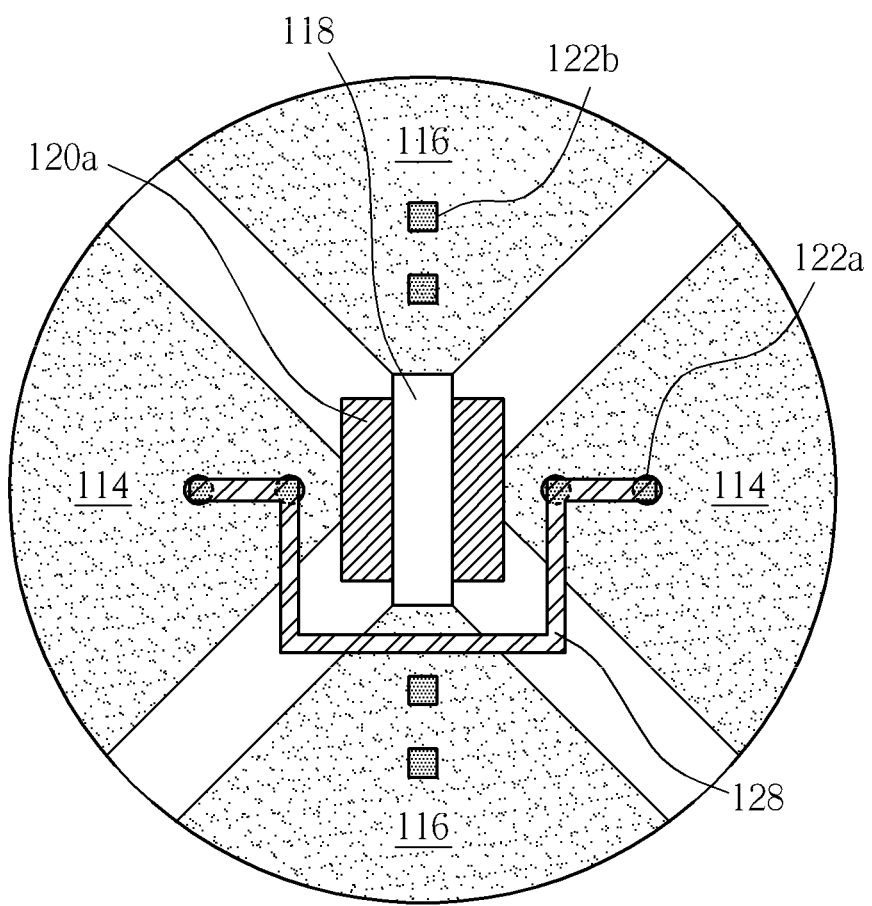
FIG. 8 schematically depicts a touch panel in accordance with the fourth embodiment of this invention.

Refer to FIG. 7, which schematically depicts a touch panel in accordance with the third embodiment of this invention. According to the touch panel of this embodiment, more than one set of the conductive repair marks 122 may be disposed on both sides of the insulating islands 120a, for instance, two or more than two sets of the conductive repair marks 122 are disposed on both sides of the insulating islands 120a. As shown in FIG. 7, two sets of the conductive repair marks 122a (totally four) are disposed on the first transparent sensing pads 114 on both sides of the insulating islands 120a; and two sets of the conductive repair marks 122b (totally fourth) are also disposed on the second transparent sensing pads 116 on both sides of the insulating islands 120a. An advantage of this embodiment is that, in the follow-up repairing line 128 process, two or more than two repair lines 128 can be formed on two adjacent transparent conductive pads in the meanwhile, therefore, the resistance of the first transparent sensing series 106 (or the second transparent sensing series 112) may be reduced after the repair process. Refer to FIG. 8, which schematically depicts a touch panel in accordance with the fourth embodiment of this invention. As shown in FIG. 8, the repair lines 128 can also be formed simultaneously within more than two sets of the contact holes 126 and are electrically connected to more than two sets of the conductive repair marks 122, thereby reducing the resistance.

Figure 9:
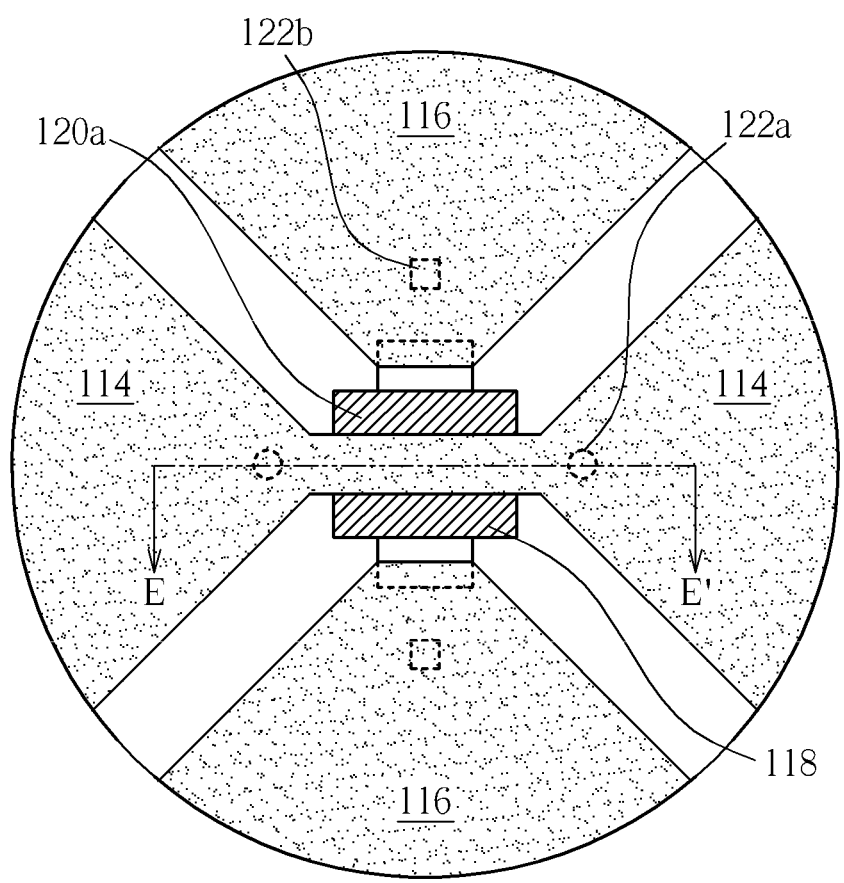
FIG. 9 and FIG. 10 schematically depict a touch panel in accordance with another embodiment of this invention.
Figure 10:
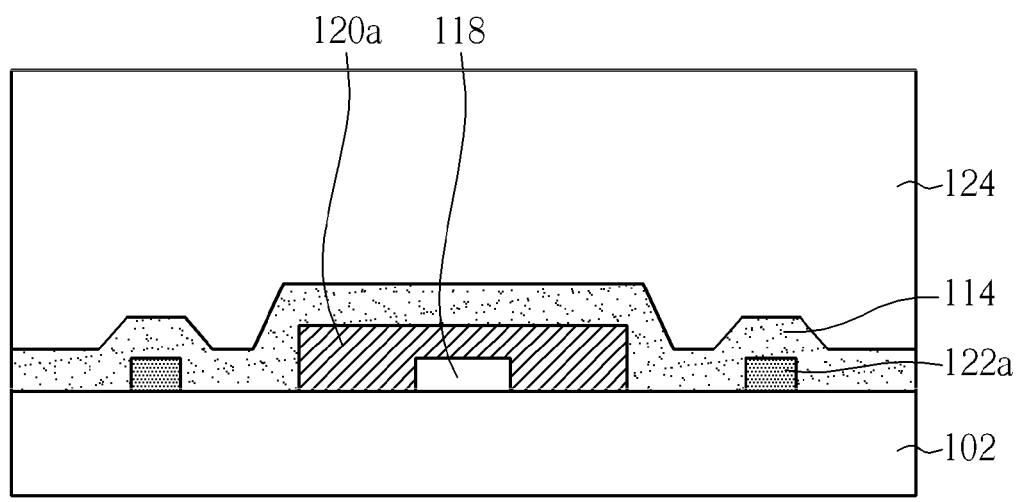
Figure 11:
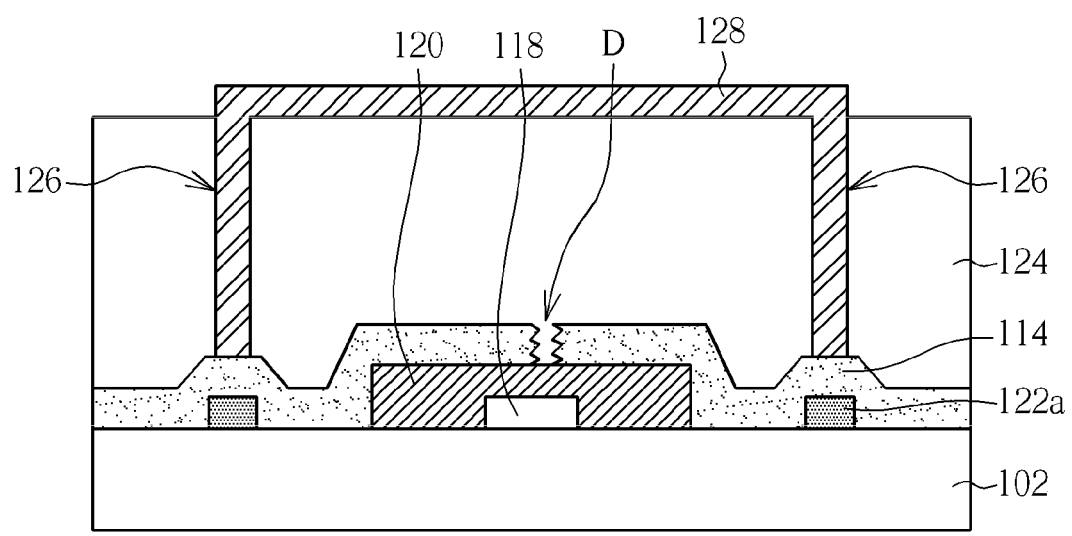
FIG. 11 schematically depicts a touch panel while repairing in accordance with one embodiment of this invention.

Besides the touch sensing array 104 shown in FIG. 1 to FIG. 8 in the present invention, the conductive repair marks 122 can be applied to other embodiments of the touch sensing array 104 as well. Refer to FIG. 9 and FIG. 10, which schematically depict a touch panel in accordance with another embodiment of this invention, wherein FIG. 10 is a sectional view taken alone line E-E' of FIG. 9. As shown in FIG. 9, a touch sensing array 104 includes a plurality of first transparent sensing pads 114, a plurality of second transparent sensing pads 116, a plurality of bridge lines 118, a plurality of isolating islands 120a, and a plurality of conductive repair marks 122a, 122b. The structure of the touch sensing array 104 in this embodiment is similar to that of FIG. 2, while the distinction from the structure of FIG. 2 is the sequence of the bridge lines 118, the isolating islands 120a, and the first transparent sensing pads 114. For instance, the steps of producing the touch panel 100 of the present embodiment includes forming the bridge lines 118 and the conductive repair marks 122a, 122b on the substrate 102 at first. Next, the isolating islands 120a are formed on the corresponding bridge lines 118, and then the first transparent sensing pads 114 and the second transparent sensing pads 116 are formed by one transparent conductive layer. In the present embodiment, the two adjacent second transparent sensing pads 116 can be electrically connected with each other through the bridge lines 118 disposed under the isolating islands 120a, and each first transparent sensing pad 114 is isolated from each second transparent sensing pads 116 by the isolating island 120a. In the present embodiment, the bridge lines 118 and the conductive repair marks 122a, 122b can be formed in the same step to save process time, but is not limited thereto. The structure of the present embodiment can be incorporated with the embodiments of the conductive repair marks 122a, 122b and the bridge lines 128 in FIG. 2 to FIG. 8. For example, refer to FIG. 11, which schematically depicts a touch panel under repairing in accordance with one embodiment of this invention. As shown in FIG. 11, the bridge lines 128 can be formed within the corresponding contact holes 126 in the protective layer 124 and electrically connected with the two adjacent first transparent sensing pads 114 by the alignment function of the conductive repair marks 122a to, therefore repairing the broken lines in area D.

Figure 12:
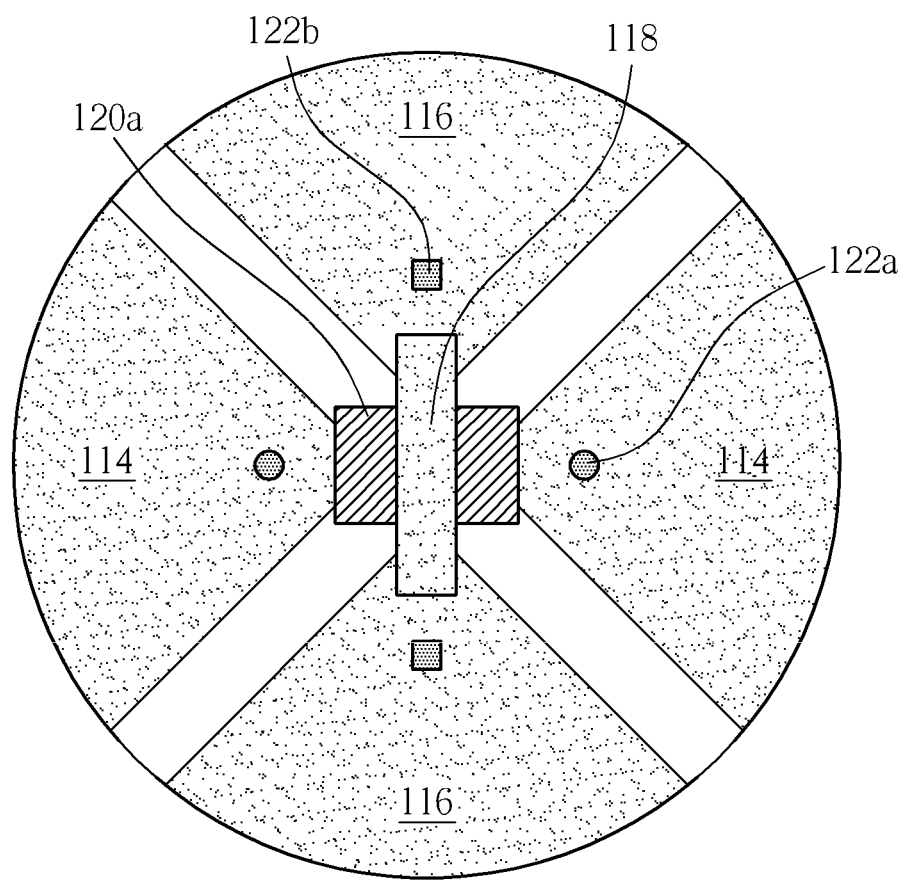
FIG. 12 schematically depicts a touch panel in accordance with another embodiment of this invention.

Refer to FIG. 12, which schematically depicts a touch panel in accordance with another embodiment of this invention. As shown in FIG. 12, the first transparent sensing pads 114 are composed of a transparent conductive layer. The second transparent sensing series 112 which includes the second transparent sensing pads 116 and the bridge lines 118 is composed of another transparent conductive layer. The insulating islands 120a are disposed between two different transparent conductive layers and respectively correspond to the intersection of each first transparent sensing series 108 and each second transparent sensing series 112. In this embodiment, the conductive repair marks 122 are also disposed on the first transparent sensing pads 114 or the second transparent sensing pads 116, wherein the embodiment is detailed in FIG. 2 to FIG. 8 and is not explained repeatly herein.

Figure 13:
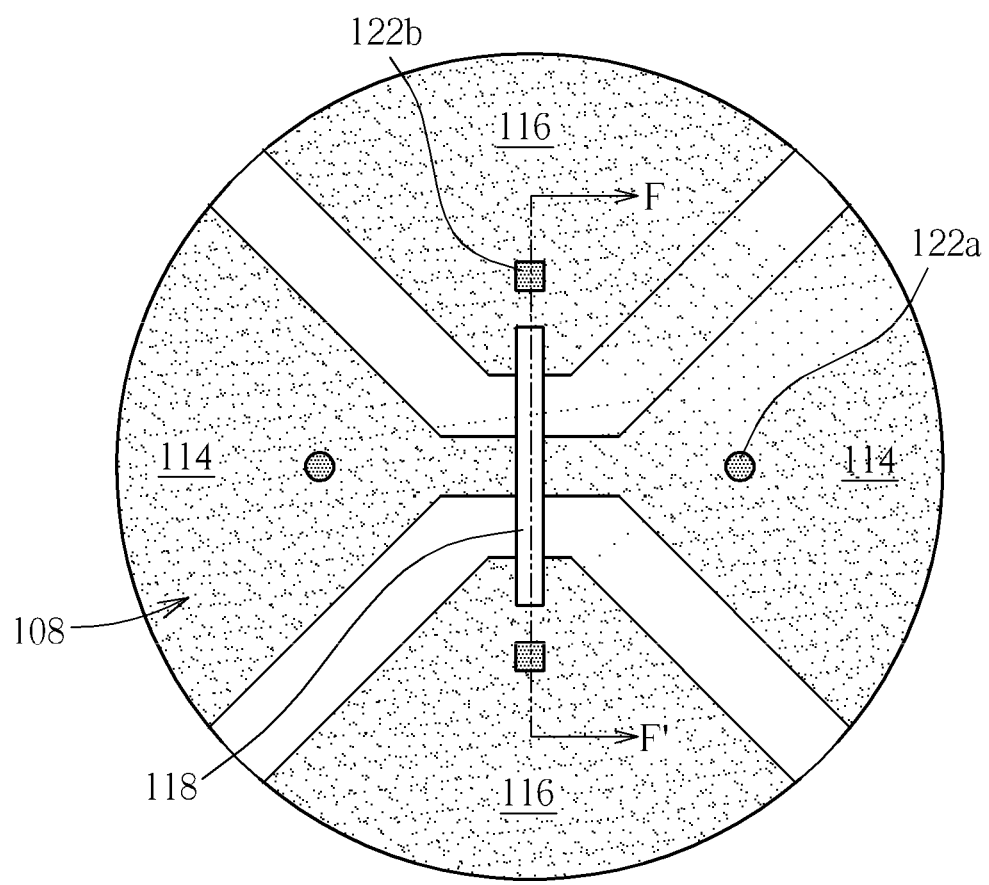
FIG. 13 and FIG. 14 schematically depict a touch panel in accordance with another embodiment of this invention.
Figure 14:
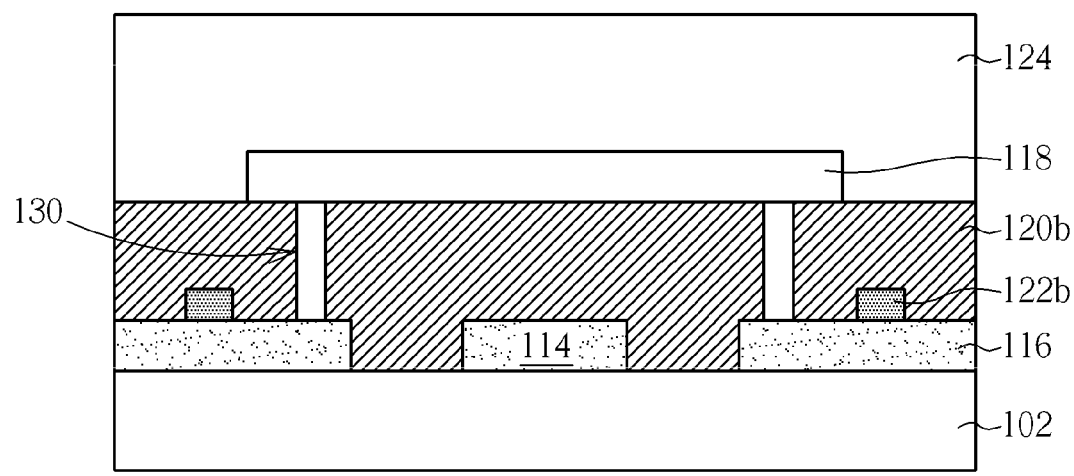

Refer to FIG. 13 and FIG. 14, which schematically depict a touch panel in accordance with another embodiment of this invention, wherein FIG. 13 is a sectional view taken alone line F-F' of FIG. 14. In the present embodiment, the first transparent sensing pads 114 and the second transparent sensing pads 116 are composed of the same transparent conductive layer. An insulating layer 120b (not shown in FIG. 13), a plurality of contact openings 130, bridge lines 118 and a protective layer 124 are disposed on the first transparent sensing pads 114 and the second transparent sensing series 112. A plurality of contact openings 130 are disposed within the insulating layer 120b and in-between the corresponding two adjacent first transparent sensing pads 114. The bridge lines 118 are electrically connected to the two adjacent first transparent sensing pads 114 via the contact openings 132. The method of forming a touch panel of the present embodiment includes forming the first transparent sensing pads 114 and the second transparent sensing pads 116 on the substrate 102 at first. Then, the conductive repair marks 122b is formed, and then an insulating layer 120b covering the first transparent sensing pads 114, the second transparent sensing pads 116, and the conductive repair mark 122b is formed. Sequentially, the contact openings 130 within the insulating layer 120b are formed and the bridge lines 130 are formed in the insulating layer 120b and the contact openings 130, to electrically connect the two adjacent second transparent sensing pads 116. In the present embodiment, the forming sequence of the conductive repair mark 122b, the first transparent sensing pads 114, and the second transparent sensing pads 116 may be reversed. For instance, the conductive repair mark 122b may be formed firstly, and then the first transparent sensing pads 114 and the second transparent sensing pads 116 are formed. In the above embodiment, the conductive repair marks 122b are electrically connected to the first transparent sensing pads 114 and the second transparent sensing pads 116, to reach a well repairing effect and reduce the sheet resistance of the first transparent sensing pads 114 and the second transparent sensing pads 116, thereby increasing the sensitivity.

Figure 15:
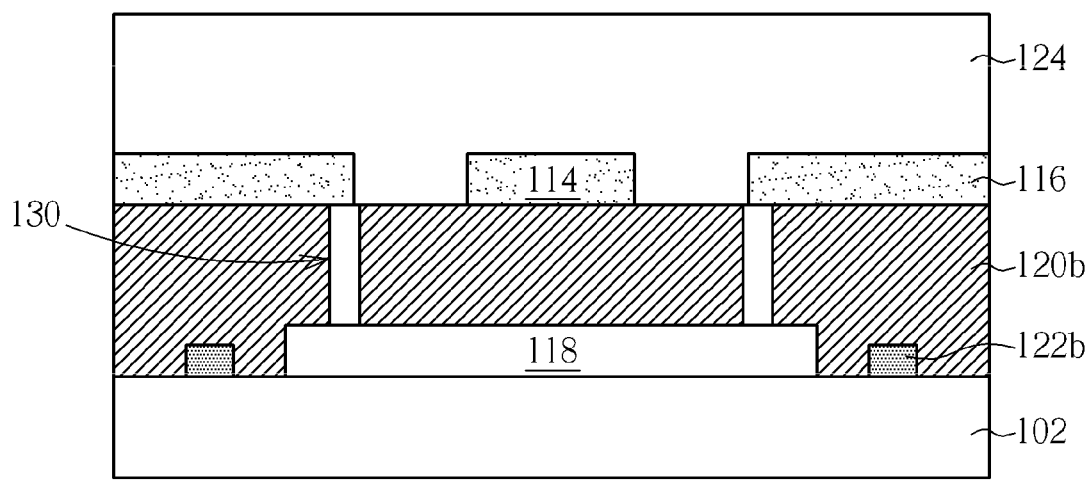
FIG. 15 schematically depicts a touch panel in accordance with still another embodiment of this invention.

In another embodiment, the bridge lines 118 may be formed firstly. Then, the insulating layer 120b, the first transparent sensing pads 114 and the second transparent sensing pads 116 are formed sequentially. Refer to FIG. 15, which schematically depicts a touch panel in accordance with still another embodiment of this invention. As shown in FIG. 15, the bridge lines 118 and the conductive repair marks 122b are formed on the substrate 102. In a preferred embodiment, the bridge lines 118 and the conductive repair marks 122b may be formed simultaneously, but is not limited thereto. Subsequently, an insulating layer 120b covering the bridge lines 118 and the conductive repair marks 122b are formed. The contact openings 130 are formed in the insulating layer 120b. Finally, the bridge lines 118 are formed within the contact openings 130 on the insulating layer 120b to electrically connect the two adjacent second transparent sensing pads 116. The structure of FIG. 13 to FIG. 15 can be incorporated with the conductive repair marks 122 and the repair lines 128 of the embodiments from FIG. 2 to FIG. 7, and the details are not described here. In the above embodiment, although the conductive repair marks 122b are not electrically connected to the first transparent sensing pads 114 and the second transparent sensing pads 116, it can still improve the repairing effect.

Figure 16:
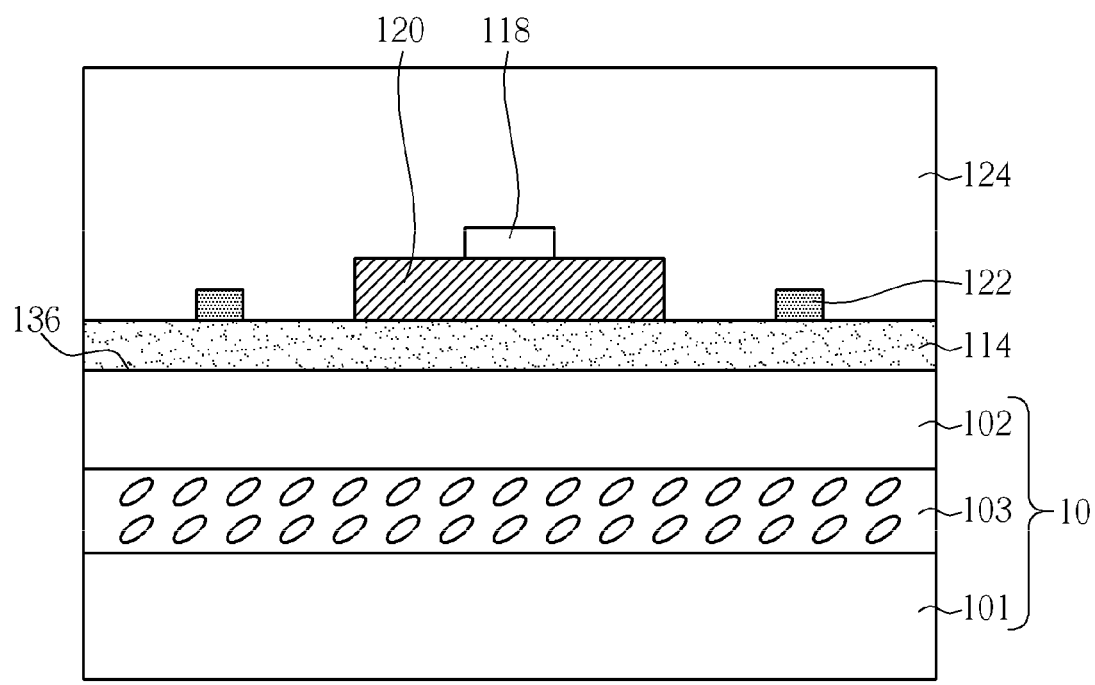
FIG. 16 to FIG. 18 schematically depict a touch display panel in accordance with other three embodiments of this invention.
Figure 17:
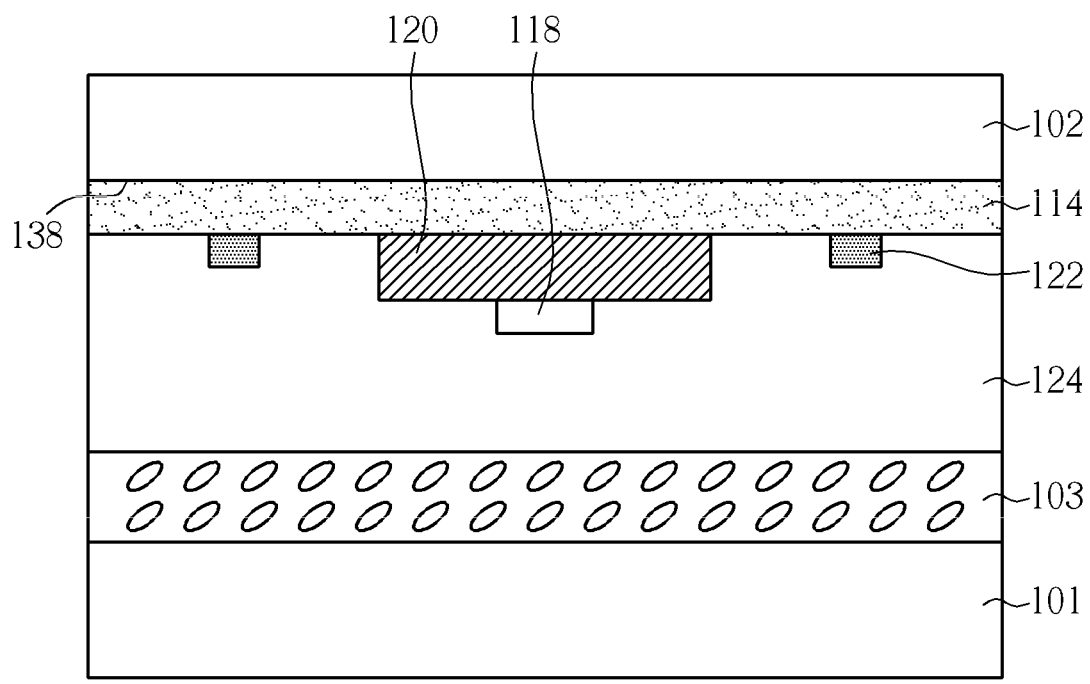
Figure 18:
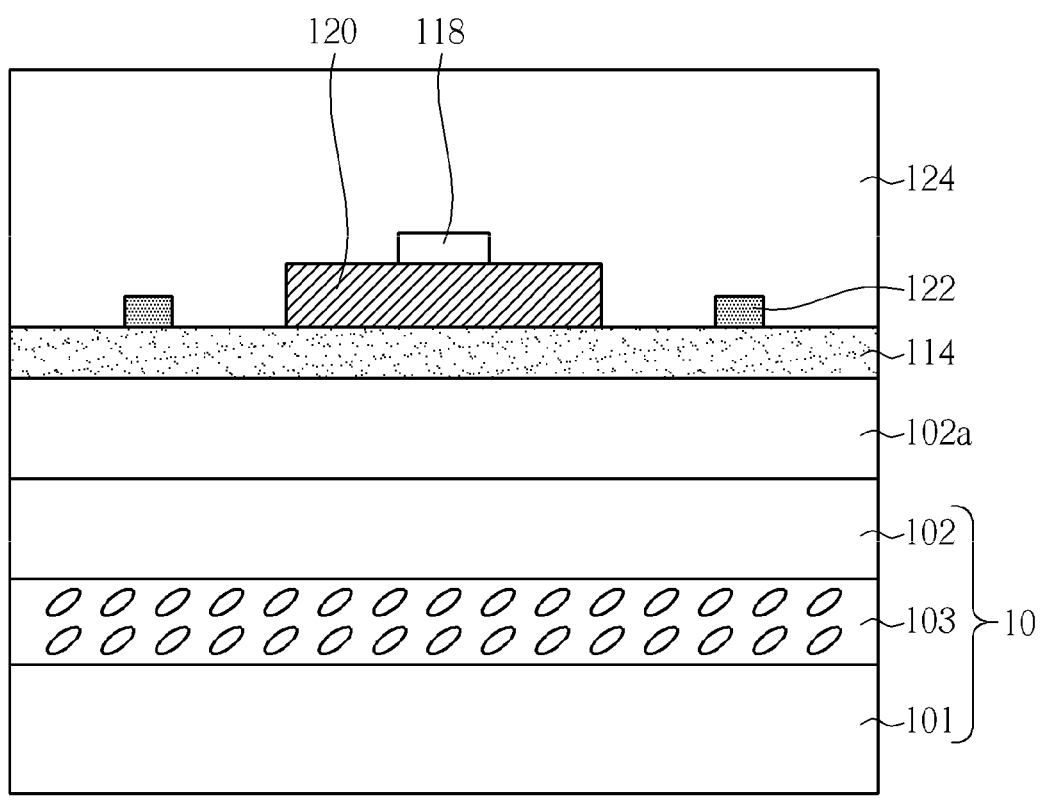

The touch panel 100 of the present invention can be a touch panel having touch functions, or can combine with a display panel 10 to form a touch display panel. Refer to FIG. 16 to FIG. 18, which schematically depict a touch display panel in accordance with other three embodiments of this invention. As shown in FIG. 16, the substrate 102 of the touch panel 100 may also used as a substrate of a display panel 10. For example, if the display panel 10 is a liquid crystal display panel, it would include two substrates 101, 102 and a liquid crystal layer 103 is disposed between the substrates 101, 102. The substrate 102 may be a color filter glass substrate of a liquid crystal display panel, wherein the touch sensing array 104 is disposed on an outer surface 136 of the substrate 102 of the display panel 10, as shown in FIG. 16. In another embodiment, the touch display array 104 can also be disposed on an inner surface 138 of the substrate 102 of the display panel 10 facing the liquid crystal layer 103, as shown in FIG. 17. In another embodiment, refer to FIG. 18, a auxiliary substrate 102a may be disposed on the substrate 102, wherein the auxiliary substrate 102a is disposed between the touch sensing array 104 and the display panel 10. For instance, the touch sensing array 104 is disposed on a surface of the auxiliary substrate 102a, and the other side of the auxiliary substrate 102a is attached on the substrate 102 of the display panel 10. In the above embodiment, the display panel 10 may be a liquid crystal display panel, an organic light emitting display panel, an electrophoresis display panel, or a plasma display panel, but is not limited thereto. When the touch sensing array 104 is disposed on the display panel 10, the conductive repair marks 122 of the touch sensing array 104 are preferred to be disposed on the shading area of the display area, such as the black matrix or the opaque capacitance area, to prevent from being observed by an user. The width of each conductive repair mark 122 is between 0.1 μm and 100 μm. It is preferred to be between 0.5 μm and 50 μm, and more preferred to be between 1 μm and 25 μm, but is not limited thereto. The width can be altered according to actual demands.

Figure 19:
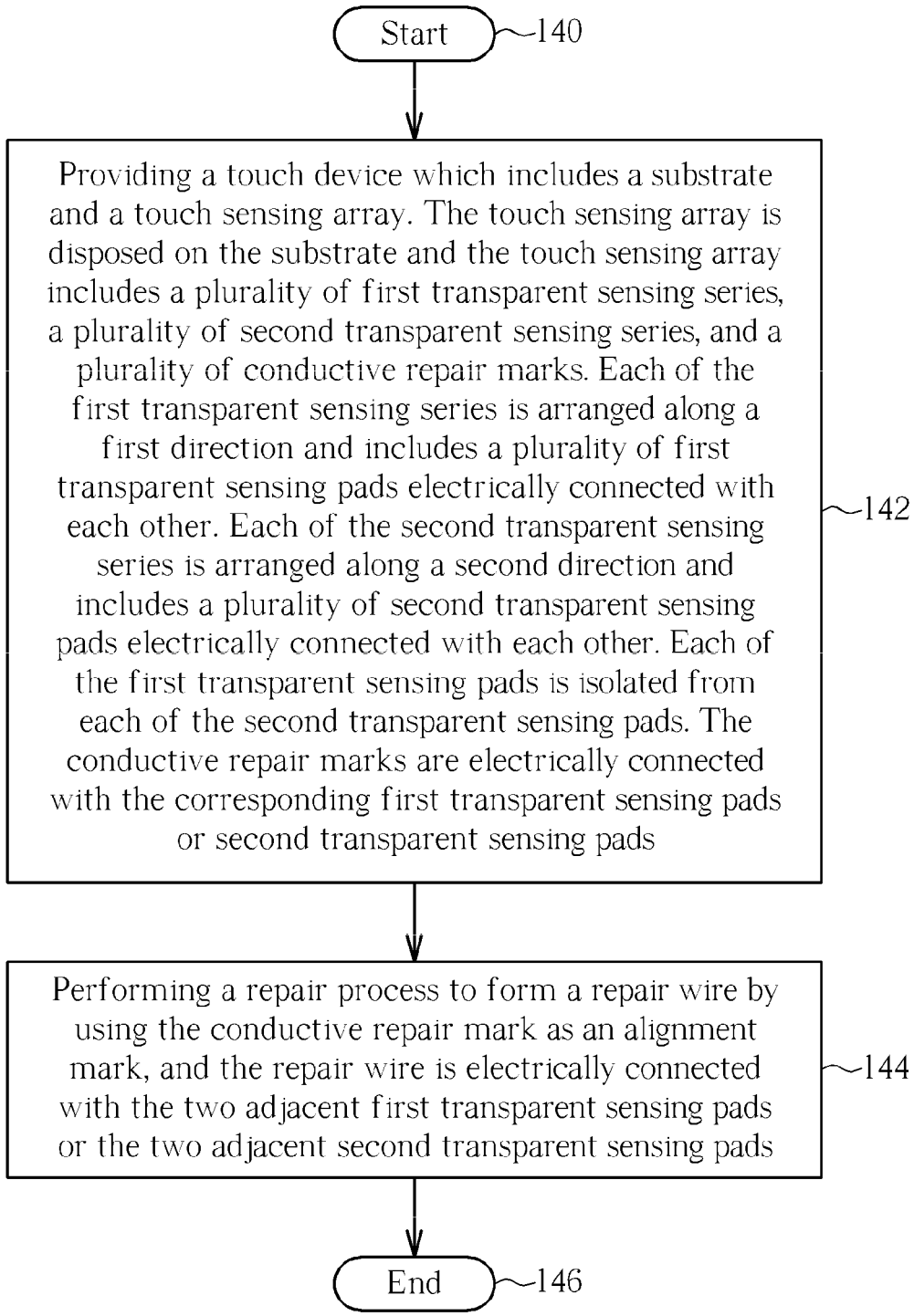
FIG. 19 schematically depicts a flow chart of repairing a touch panel in accordance one embodiment of this invention.

The present invention further provides a method of repairing a touch panel. Please refer to FIG. 19 and FIG. 1 to FIG. 18, wherein FIG. 19 schematically depicts a flow chart of the method of repairing a touch panel in accordance one embodiment of this invention. As shown in FIG. 19, the method of repairing a touch panel of the invention includes the steps as follow:

Step 140: start;

Step 142: providing a touch panel which includes a substrate and a touch sensing array. The touch sensing array is disposed on the substrate and the touch sensing array includes a plurality of first transparent sensing series, a plurality of second transparent sensing series, and a plurality of conductive repair marks. Each of the first transparent sensing series is arranged along a first direction and includes a plurality of first transparent sensing pads electrically connected with each other. Each of the second transparent sensing series is arranged along a second direction and includes a plurality of second transparent sensing pads electrically connected with each other. Each of the first transparent sensing pads is isolated from each of the second transparent sensing pads. The conductive repair marks are electrically connected with the corresponding first transparent sensing pads or second transparent sensing pads.

Step 144: performing a repair process to form a repair line by using the conductive repair mark as an alignment mark, and the repair line is electrically connected with the two adjacent first transparent sensing pads or the two adjacent second transparent sensing pads.

Step 146: End.

In step 142, the embodiment of the conductive repair marks 122 is shown in FIG. 2 to FIG. 8, and the embodiment of the touch sensing array 104 is shown in FIG. 9 to FIG. 15. It is understood that a variety of embodiments of the conductive repair marks 122 can be incorporated with a variety of the embodiments of the touch sensing array 104.

Furthermore, in step 144, the conductive repair marks 122 are used as alignment marks to form the repair lines 128 electrically connected to portion of the conductive repair marks 122. For instance, a laser process is performed to form the contact holes 126 corresponding to the conductive repair marks 122 in the protective layer 126. Sequentially, a deposition process is performed, such as a laser chemical vapor deposition process, to form the repair lines 128. The planar layout for of the repair lines 128 may be in accordance with the linear conductive repair marks 128 as shown in FIG. 4, or curved conductive repair marks 128 as shown in FIG. 6

To sum up, due to the conductive repair marks with non-transparent materials of the present invention which is disposed on the transparent sensing pads, the conductive repair marks in the follow-up repair process can be alignment marks and the connect holes on the conductive repair marks can be formed more easily so as to increase the integral efficiency. Furthermore, the present invention also provides embodiments of the repair lines and the conductive repair marks to reduce the resistance of the touch sensing array after the repair process and enhance the reliability of products.

Those skilled in the art will readily observe that numerous modifications and alterations of the device and method may be made while retaining the teachings of the invention.

What is claimed is:

1. A touch display panel, comprising:
   a display panel; and
   a touch sensing array disposed on the display panel, wherein the touch sensing array comprises:
     a plurality of first transparent sensing series arranged along a first direction, each of the first transparent sensing series comprising a plurality of first transparent sensing pads electrically connected with each other;
     a plurality of second transparent sensing series arranged along a second direction, each of the second transparent sensing series comprising a plurality of second transparent sensing pads electrically connected with each other, and each of the first transparent sensing pads being isolated from each second transparent sensing pads;
     a plurality of conductive repair marks disposed corresponding to the first transparent sensing pads or the second transparent sensing pads, wherein each of the first transparent sensing pads is overlapped with at least one conductive repair mark and the conductive repair marks comprise a plurality of first conductive repair marks respectively disposed on and electrically connected with the two adjacent first transparent sensing pads of the same first transparent sensing series; and
     a protective layer covering the first transparent sensing series and the second transparent sensing series.

2. The touch display panel according to claim 1, wherein a material of the conductive repair marks comprises metal.

3. The touch display panel according to claim 1, wherein a width of each conductive repair mark is substantially between 1 μm and 25 μm.

4. The touch display panel according to claim 1, further comprising:
   a first repair line disposed on the protective layer, wherein the first repair line is electrically connected with the first conductive repair marks and the two adjacent first transparent sensing pads via a plurality of first contact holes within the protective layer where a defect occurs.

5. The touch display panel according to claim 1, wherein the conductive repair marks comprise a plurality of second conductive repair marks respectively disposed on and electrically connected with the two adjacent second transparent sensing pads of the same second transparent sensing series.

6. The touch display panel according to claim 5, further comprising:
   a second repair line disposed on the protective layer, wherein the second repair line is electrically connected with the second conductive repair marks and the two adjacent second transparent sensing pads via a plurality of second contact holes within the protective layer where a defect occurs.

7. The touch display panel according to claim 1, wherein the first transparent sensing pads and the second transparent sensing pads are made of the same transparent conductive layers, the touch sensing array further comprises a plurality of insulating islands respectively disposed between the two adjacent first transparent sensing pads of the same first transparent sensing series, and a plurality of bridge lines are respectively disposed on each insulating islands and respectively electrically connected with the two adjacent second transparent sensing pads.

8. The touch display panel according to claim 1, wherein the first transparent sensing pads are made of a first transparent conductive layer, the second transparent sensing pads are made of a second transparent conductive layer, the touch sensing array further comprises a plurality of isolating islands disposed between the first transparent conductive layer and the second transparent conductive layer, and each of the isolating island respectively corresponds to one of the overlapping position of each first transparent sensing series and each second transparent sensing series.

9. The touch display panel according to claim 1, wherein the first transparent sensing pads and the second transparent sensing pads are made of the same transparent conductive layers, the touch sensing array further comprises an insulating layer covering the first transparent sensing pads and the second transparent sensing pads, and a plurality of bridge lines are disposed on the insulating layer and in-between the two adjacent second transparent sensing pads of the respectively corresponding second transparent sensing series, wherein the insulating layer comprises a plurality of contact openings, and the bridge lines are respectively electrically connected with the two adjacent second transparent sensing pads via the contact openings.

10. The touch display panel according to claim 1, wherein the display panel has an inner surface and the touch sensing array is disposed on the inner surface.

11. The touch display panel according to claim 1, wherein the display panel has an outer surface and the touch sensing array is disposed on the outer surface.

12. The touch display panel according to claim 1, further comprising an auxiliary substrate, wherein the display panel has an outer surface, the touch sensing array is disposed on the outer surface of the display panel, and the auxiliary substrate is disposed between the touch sensing array and the display panel.

13. A touch panel, comprising:
a substrate; and
a touch sensing array disposed on the substrate, wherein the touch sensing array comprises:
  a plurality of first transparent sensing series arranged along a first direction, wherein each first transparent sensing series comprises a plurality of first transparent sensing pads electrically connected with each other;
  a plurality of second transparent sensing series arranged along a second direction, wherein each second transparent sensing series comprises a plurality of second transparent sensing pads electrically connected with each other, and each first transparent sensing pad is isolated from each second transparent sensing pad;
  a plurality of conductive repair marks disposed corresponding to the first transparent sensing pads or the second transparent sensing pads, wherein each of the first transparent sensing pads is overlapped with at least one conductive repair mark and the conductive repair marks comprise a plurality of first conductive repair marks respectively disposed on and electrically connected with the two adjacent first transparent sensing pads of the same first transparent sensing series; and
  a protective layer covering the first transparent sensing series and the second transparent sensing series.

14. A method for repairing a touch panel, comprising:
providing a touch panel, comprising a substrate and a touch sensing array disposed on the substrate and having a defect, the touch sensing array comprising:
  a plurality of first transparent sensing series arranged along a first direction, wherein each first transparent sensing series comprises a plurality of first transparent sensing pads electrically connected with each other;
  a plurality of second transparent sensing series arranged along a second direction, wherein each second transparent sensing series comprises a plurality of second transparent sensing pads electrically connected with each other, and each first transparent sensing pad is isolated from each second transparent sensing pad;
  a plurality of conductive repair marks disposed corresponding to the first transparent sensing pads or the second transparent sensing pads, wherein each of the first transparent sensing pads is overlapped with at least one conductive repair mark;
  a protective layer covering the first transparent sensing series and the second transparent sensing series;
  a plurality of insulating islands respectively disposed between the two adjacent first transparent sensing pads of the same first transparent sensing series, and
  a plurality of bridge lines are respectively disposed on each insulating islands and respectively electrically connected with the two adjacent second transparent sensing pads, wherein the conductive repair marks and the bridge lines are formed simultaneously; and
performing a repair process using the conductive repair marks as alignment marks to form a repair line electrically connected with the adjacent first or second transparent sensing pads where the defect located.

15. The method for repairing a touch panel according to claim 14, wherein the conductive repair marks comprise a plurality of first conductive repair marks respectively disposed on and electrically connected with the two adjacent first transparent sensing pads of the same first transparent sensing series.

16. The method for repairing a touch panel according to claim 14, wherein the conductive repair marks comprise a plurality of second conductive repair marks respectively disposed on and electrically connected with the two adjacent second transparent sensing pads of the same second transparent sensing series.

17. The method for repairing a touch panel according to claim 14, wherein the touch sensing array further comprises an insulating layer covering the first transparent sensing pads and the second transparent sensing pads, and a plurality of bridge lines are disposed on the insulating layer and in-between the two adjacent second transparent sensing pads of the respectively corresponding second transparent sensing series, wherein the insulating layer comprises a plurality of contact openings, and the bridge lines are respectively electrically connected with the two adjacent second transparent sensing pads via the contact openings.

18. The method for repairing a touch panel according to claim 14, wherein the step of performing a repair process using the conductive repair marks as alignment marks to form a repair line comprises:

forming a plurality of contact holes corresponding to the conductive repair marks within the protective layer; and forming the repair line on the protective layer to render the repair line electrically connected to a portion of the conductive repair marks through the contact holes.

19. The method for repairing a touch panel according to claim 14, wherein the step of performing a repair process using the conductive repair marks as alignment marks to form a repair line comprises a Laser Chemical Vapor Deposition (laser CVD).

20. The method for repairing a touch panel according to claim 14, wherein the step of forming the touch sensing array comprises:

forming the first transparent sensing series and the second transparent sensing pads;

forming a patterned insulating layer covering a portion of the first transparent sensing series;

forming the bridge lines and the conductive repair marks, and rendering the bridge lines electrically connected to the two adjacent second transparent sensing pads, to form each second transparent sensing series; and forming the protective layer covering the first transparent sensing series, the second transparent sensing series, and the conductive repair marks.

21. The method for repairing a touch panel according to claim 14, wherein the step of forming the touch sensing array comprises:

forming the bridge lines and the conductive repair marks disposed on the substrate;

forming a patterned insulating layer covering a portion of each bridge lines;

forming each first transparent sensing series and each second transparent sensing pads, and rendering the bridge lines electrically connected to the two adjacent second transparent sensing pads, to form each second transparent sensing series; and forming the protective layer covering the first transparent sensing series and the second transparent sensing series.

* * * * *